United States Patent Office 2,862,008
Patented Nov. 25, 1958

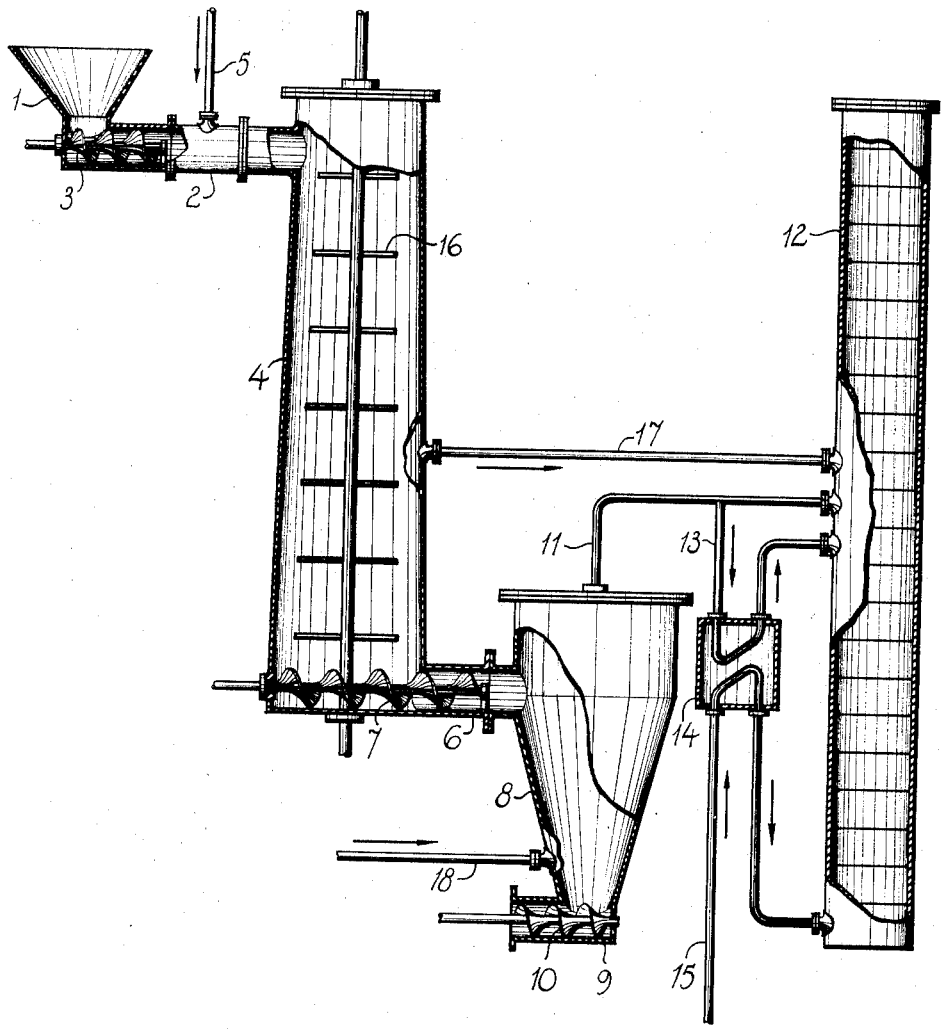

2,862,008
METHOD FOR CONTINUOUS PRODUCTION OF FURFURAL FROM SUITABLE RAW MATERIAL

Carl Gunnar Carlsson Skogh and Göte Emanuel Sävö, Goteborg, Sweden

Application October 5, 1953, Serial No. 384,211

Claims priority, application Sweden October 15, 1952

1 Claim. (Cl. 260—347.9)

The invention relates to a method and/or arrangement for the continuous production of furfural from some suitable raw material such as pentosan and substances containing same. The raw material may thus consist of chips or the like of the wood from foliaceous trees, such as oak, chestnut, birch, alder, aspen etc.; corn cobs; brushwood; straw and husks of cereals, such as wheat, oats, barley; residue from olive pressings etc. With one exception, all practical methods of furfural production up to the present involve several separate operations. These methods are characterised by the raw material being disposed in batches into a reaction vessel or digester for heating, and on completion of the process being removed from the digester, after which a fresh batch of raw material is inserted. The methods referred to suffer various disadvantages which need not be further discussed.

A suggestion, as described in the Brownlee U. S. Patent No. 1,919,878 of July 25, 1933, and referring to the continuous production of furfural, has therefore been made heretofore. According to this method, heretofore described, the raw material is allowed to pass through horizontally disposed tubular digesters with two or more tubes arranged above each other, the raw material being introduced into one end of the topmost tube and propelled to the other end of said tube, from which it is allowed to enter the tube disposed at a next lower level, and so on, after which the reaction residue is expelled at the terminal end of the lowest tube. Steam is injected into this latter tube at the point where the residue is expelled, allowed to pass through all the tubes and to leave the system, together with the furfural extracted, at the vapor outlet and situated close to the intake for the raw material. This continuous process of the prior art, however, is subject to several drawbacks and for this reason has not been adopted to any great extent for practical use.

The present invention relates to a method of producing furfural at a continuous rate from some suitable raw material such as pentosan, or substances containing same, by causing the said material to be continuously fed into a digester through an opening at one end of the said digester, into which steam of suitable temperature and pressure and saturation is simultaneously injected, and a suitable degree of acidity in the reaction mixture is maintained, the furfural being formed during the passage of the mixture through the digester, and the reaction residue continuously expelled through an outlet at the other end of the digester. This method of the present invention differs from the previously mentioned continuous process of the prior art mainly in the fact that a very substantial proportion of the quantity of furfural formed is caused to enter, together with the reaction residue, into an expansion vessel in which furfural and steam is separated from the residue subsequent to the reaction process. The steam required for the reaction is supplied to the new material at, or in close proximity to its entry into the digester. Separation of the furfural from the residue will be practically completed in the expansion vessel. Furfural at a high concentration will then be present in the mixture of furfural and steam which passes from the expansion vessel to a distillation plant. This is obviously of considerable advantage from the point of view of heat economy. It can be stated that, in using the method according to the present invention, approximately 30% furfural can be obtained direct from the digester when using a raw material containing 20% pentosan, a result the like of which has never been achieved with any of the previous methods.

An embodiment of the present invention by way of example, showing an arrangement for the completion of the process according to the present invention, is shown diagrammatically in the attached sole figure of the drawing. From a funnel-shaped hopper container 1 the raw material containing pentosan is propelled to the digester 4 by means of a feed screw 3 and a pipe 2. The digester 4 may preferably have a somewhat expanded shape at the outlet end. The pipe 5 supplies steam to the raw material intake, i. e. the actual inlet pipe 2 or the upper portion of the digester 4. The temperature of the saturated steam from pipe 5 should be between 125 and 250 degrees Centigrade, and under a pressure suitable to the type of raw material used and subject to other conditions of operational proceedings. In certain cases, steam of a temperature of 170° C. has been used with good results. For completion of the reaction, the mixture should have a definite degree of acidity, variable according to requirements for various materials and operational conditions. The pH-value of the acid content, however, should always be below 5, and in the case of raw material of wood, should be kept at an average value of approximately 2.5. The required degree of acidity can be attained either by adding acid, for example, a diluted mineral or organic acid to the raw material prior to, or on its entry into the digester 4.

Alternatively, the acidity required for the process can be produced from the material itself by heating. This will occur if, for example, wood chips or the like of the kinds of wood mentioned above are used as raw material, and the temperature in the digester 4 is kept sufficiently high, viz. 150–170° C.

The lower end of the digester is connected through a pipe 6 and an expeller device 7 in the shape of a worm screw or the like, to an expansion vessel 8, which has a bottom outlet 9 associated with an expeller 10. Through an exhaust pipe 11 from its top the said expansion vessel is connected to a distillation plant 12 of known type. A branch conduit 13 of the exhaust pipe 11 passes through a steam converter 14 for the heating of a pipe 15 carrying water for heating of the contents in the lower portion of the distillation column 12.

The arrangement described above operates in the following manner: Aided by the screw impeller device 3, the raw material is continuously fed to the upper part of the digester 4 and by its own weight passes through the said digester to the screw expeller device 7 which continuously feeds the material into the expansion vessel 8. The worm screws 3 and 7, in combination with the material they propel through the pipes 2 and 6, form effective seals against the escape of steam supplied to the digester through the steam supply inlet 5, with the result that the required pressure can be maintained in the said digester.

In order to complete the formation of furfural, the raw material has to remain in the digester 4 for a minimum period, the duration of which varies according to the raw material used. The period varies also according to the temperature and degree of acidity of the mixture and may be completed in 20 minutes or take as long as three hours. In the process, the pentosans are turned into pentose by hydrolysis so as to form furfural under the influence of heat and through the catalytic agent of hydrogen ions. During the passage of the material through the digester, the formation of furfural increases up to a certain maximum, after which it gradually lessens, finally ceasing entirely by the time the material is fed into expansion vessel 8.

Furfural, condensed water and steam thus enter the expansion vessel, where the pressure is very much lower than in the digester (atmospheric or near atmospheric pressure) together with the solid residues of the reaction. The residue is therefore immediately de-steamed whereupon the furfural and steam passes through the conduit 11 to the distillation column 12. The solid residue precipitates to the bottom in the expansion vessel 8 and is then removed from the plant by means of the expeller screw 10. Further treatment and purification of the furfural by distillation is carried out in known manner and need not be further described in this connection.

As previously mentioned, by means of the steam converter 14, the heat from a portion of the vaporous exhaust from the expansion vessel 8 can be utilised for heating the contents of the lower portion of the distillation column 12, whereas the remaining quantity of steam from the said expansion vessel is taken to a higher level in the said column.

It is obvious that the equipment for the carrying out of this process can be varied in many ways and yet retain the essential features of the present invention. It is thus possible, for example, to feed the raw material into the bottom portion of the digester and arrange for the feeding of the residue to the expansion vessel from the top end of the said digester.

The digester 4 may be equipped with a mechanically operated agitator 16, and also may be fitted with an arrangement for the feeding and breaking up of the raw material in the course of its passage through the vessel. It is not absolutely essential for all the furfural to enter the expansion vessel. A small portion of the total quantity of furfural formed may be drawn from the digester before the mixture reaches the outlet 7, for example, by means of a by-pass pipe 17, provided with a pressure reducing valve, before entry into the distillation column 12. If preferred, steam under low pressure could be injected into the expansion vessel 8 through the pipe 18. The advantage thus gained would be that cheaper and poorer quality steam could be used for the purpose of extracting any furfural remaining in the residue.

Instead of taking the mixture of furfural and steam direct to the distillation plant, said mixture could be allowed to condense, and a considerable proportion of the furfural extracted by decanting.

In addition to furfural, various other chemical substances are derived from the raw material in the same process, such as acetic acid, acetaldehyde, methanol, etc., which can be separated and utilised by known methods.

What we claim is:

In a process for producing furfural from solid raw material containing pentosan, employing a closed digester, a closed expansion vessel, and a distillation column, the steps of slowly reacting together and passing said raw material and steam as a reaction mass in said digester, from an intake point of said digester to a discharge point of said digester, passing said reaction mass and a first part of the steam and gaseous reaction products from said discharge point of said digester to an intake point of said expansion vessel, expanding the reaction mass in said expansion vessel to separate gaseous products comprising steam and furfural from solid residues, discharging gaseous products comprising steam and furfural from said expansion vessel at a discharge point thereof, passing said gaseous products so discharged from said discharge point of said expansion vessel from said expansion vessel to said distillation column, deriving a second part of the steam and gaseous reaction products from an intermediate point of said digester intermediate its intake and discharge points and substantially spaced from each of said points, and passing said derived second part directly from said digester intermediate point to said distillation column.

References Cited in the file of this patent

UNITED STATES PATENTS

| | | |
|---|---|---|
| 1,275,000 | Dodge et al. | Aug. 6, 1918 |
| 1,919,878 | Brownlee | July 25, 1933 |
| 1,946,688 | Groth et al. | Feb. 13, 1934 |
| 2,070,125 | Hancock et al. | Feb. 9, 1937 |
| 2,436,804 | Hill | Mar. 2, 1948 |